March 9, 1926.
C. F. TAYLOR
1,576,157
AUTOMOBILE LICENSE SIGN
Filed Feb. 21, 1922
2 Sheets-Sheet 1
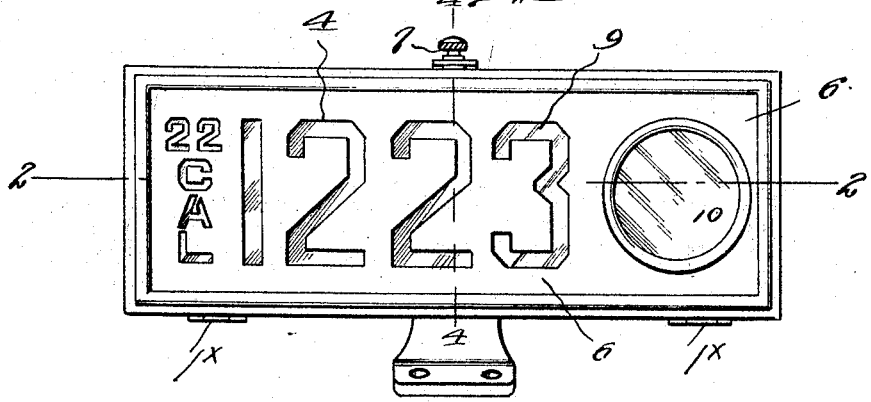
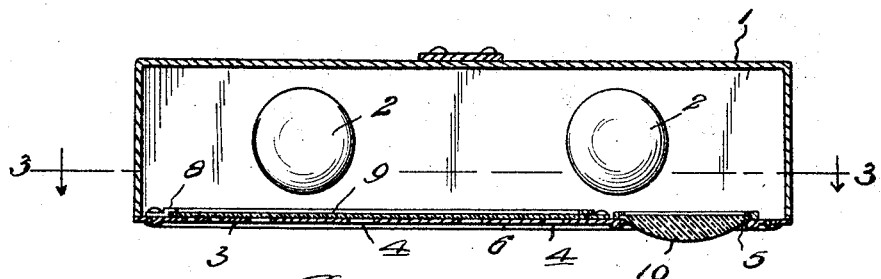
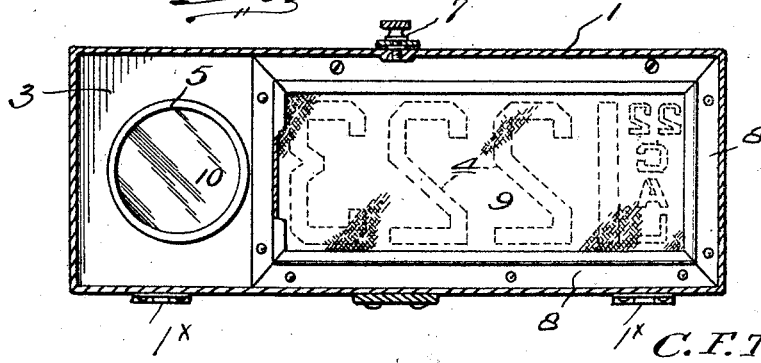

March 9, 1926. 1,576,157
C. F. TAYLOR
AUTOMOBILE LICENSE SIGN
Filed Feb. 21, 1922 2 Sheets-Sheet 2

Witnesses:
Robert E. Davidson
Wm. R. Thickstun

Inventor
C. F. Taylor,
By Clarence O'B___
Attorney

Patented Mar. 9, 1926.

1,576,157

UNITED STATES PATENT OFFICE.

CHARLES F. TAYLOR, OF FORTUNA, CALIFORNIA.

AUTOMOBILE LICENSE SIGN.

Application filed February 21, 1922. Serial No. 538,178.

*To all whom it may concern:*

Be it known that I, CHARLES F. TAYLOR, a citizen of the United States, residing at Fortuna, in the county of Humboldt and State of California, have invented new and useful Improvements in Automobile License Signs, of which the following is a specification.

One object of my said invention is the provision of an automobile license sign adapted to display an illuminated license number in such manner that the same can be readily discerned in the dark as well as in the daylight, the license number being colored as required by law, and the construction of the device being such as to lend itself to variously coloring the license number so that the color displayed may meet the requirements of a particular State.

Another object of the invention is the provision of a construction whereby the lamp or lamps employed to illuminate the license number are also used to illuminate a red taillight lens.

To the attainment of the foregoing, the invention consists in the improvement as hereinafter described and definitely claimed.

In the accompanying drawings, forming part of this specification:—

Figure 1 is a rear elevation illustrating my novel sign as ready to be properly positioned on the rear portion of an automobile.

Figure 2 is a section on line 2—2 of Figure 1.

Figure 3 is a vertical section in the plane indicated by the line 3—3 of Figure 2.

Similar numerals of reference designate corresponding parts in Figures 1-4.

Figure 5:
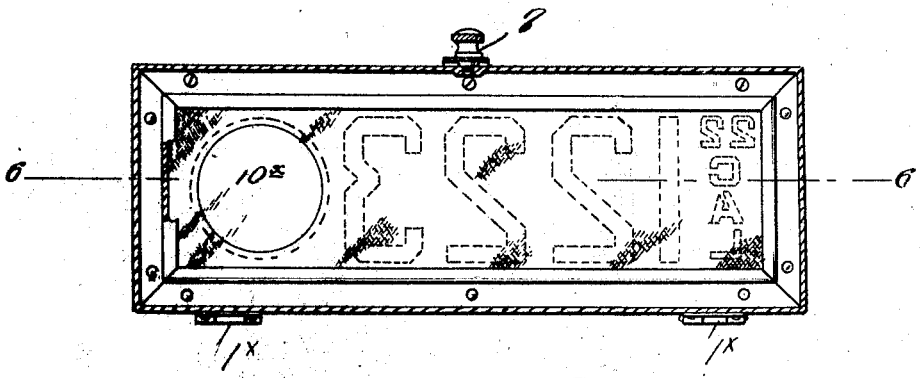
Figures 5 and 6 are sections of a modification, Figure 6 being taken on line 6—6 of Figure 5.

Among other elements my novel sign comprises a casing 1 equipped in the manner illustrated or in any other appropriate manner for attachment to the rear portion of an automobile.

In the said casing 1 are arranged lamps 2 which are preferably, but not necessarily, incandescent electric lamps as illustrated.

Carried as illustrated or in any other approved manner at the rear portion of the casing 1 is the number plate 3, formed by the movable rear casing or closure wall; the said plate being preferably of metal and being designated a number plate because a license number indicated by 4 is cut therein and throughout the thickness thereof so that the light from the lamps 2 will shine through the numerical figures and render the same plainly visible at night as well as in the day time. I would also have it understood that the plate 3 will preferably have cut through the same, the number 22, indicating the year of the license as well as the abbreviation of the name of the State issuing the license "Cal.", for instance, Figure 1. In addition to the openings described, the plate 1 is provided adjacent to one of its ends with a circular opening 5 which extends throughout the thickness of the plate.

The said closure wall of the casing has its imperforate portion designated by 6 and may be associated with the casing and may be secured in closed position in any appropriate manner without involving departure from the scope of my invention as defined in my appended claim. I prefer, however, to hinge the movable closure plate or wall 3 to the casing 1 at $1^x$ and to detachably secure the plate or wall in closed position by a fastener such as 7.

Secured at 8 in a frame carried by the plate or wall 3 is the colored pane of glass 9 comprised in my improvement, the said glass 9 being colored according to the requirements of the particular State wherein the sign is to be used. In the illustrated example the glass 9 is of orange color and hence the license number will be given that color. It will be noted, however, that the frame 8 is so constructed and detachably connected to the casing 1, Figure 3, that the glass 9 may be expeditiously and easily removed therefrom and a glass of another color may be as readily placed and secured in the frame and casing.

Inserted in the opening 5 of the plate or wall 3 is a disk 10 of red glass. This disk 10 is arranged in communication with the casing interior and hence will be illuminated and enabled to serve as an efficient taillight.

Figure 6:
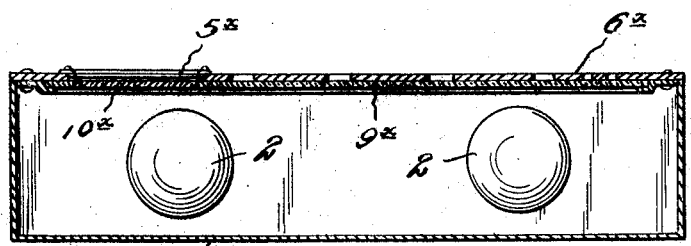
Figure 4:
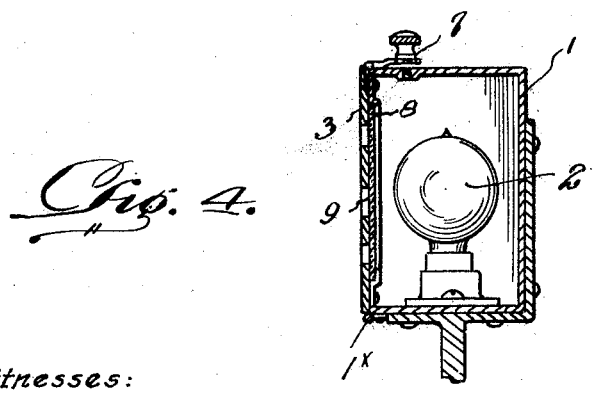
Figure 4 is a transverse section taken in the plane indicated by the line 4—4 of Figure 1.

Manifestly when desired the said taillight may be provided by inserting a disk $10^x$ of red colored glass, Figures 5 and 6, in the colored pane of glass $9^x$, in coincidence with a portion $5^x$, of clear glass, carried in the apertured plate or casing wall $6^x$ as shown in Figure 6, or merely in coincidence with a circular opening in said plate or wall 6ˣ.

It will be apparent from the foregoing that my novel license sign is materially advantageous for the reasons stated and yet is simple in construction and well adapted to withstand the exposure and usage to which license plates are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters Patent, is:

An illuminated license sign holder comprising an elongated parallelepiped casing, said casing including a door which forms the forward side thereof, said door being hinged to the bottom wall of the casing, and when in closed position adapted to bear at its inner side against the forward edges of the bottom, top and end walls of said casing, said door being formed with a plurality of openings of predetermined form, corresponding to the shape of suitable numerals and indicia, a glass plate mounted on and against the inner side of the door, over the portion formed with said opening to provide a backing therefor, and a fastener having a pair of hinged members, one of which is fixed to the free edge portion of the door, at the central portion of the upper edge of said door, and the other hinged member adapted to swing over the top wall of the casing, and a screw carried by the last mentioned hinged member of the fastener adapted to threadably engage an opening in the top wall of the casing and draw the hinged member toward the casing and the door tightly against the forward edges of said casing.

In testimony whereof, I affix my signature.

CHARLES F. TAYLOR.